United States Patent [19]

Harris

[11] Patent Number: 4,950,316

[45] Date of Patent: Aug. 21, 1990

[54] DEHUMIDIFICATION SYSTEM

[76] Inventor: Charles Harris, 5314 West Luke, Glendale, Ariz. 85301

[21] Appl. No.: 386,420

[22] Filed: Jul. 28, 1989

[51] Int. Cl.[5] .................................... B01D 35/18

[52] U.S. Cl. .................................... 55/269; 55/439; 55/467; 62/289

[58] Field of Search .................... 55/23, 80, 183, 185, 55/184, 267, 268, 467, 269, 439, 437; 62/92, 93, 285, 289

[56] References Cited

U.S. PATENT DOCUMENTS

| | | | |
|---|---|---|---|
| 3,490,201 | 1/1970 | Colvin et al. | 55/268 X |
| 3,596,475 | 8/1971 | Berger | 62/285 |
| 3,861,165 | 1/1975 | Hiyano | 62/93 |
| 4,135,370 | 1/1979 | Hosoda et al. | 62/92 X |
| 4,350,020 | 9/1982 | Rojey | 62/93 |
| 4,428,205 | 1/1984 | Doderer | 62/93 |
| 4,555,912 | 12/1985 | Bogosh | 62/93 X |

*Primary Examiner*—Robert Spitzer
*Attorney, Agent, or Firm*—Tod R. Nissle

[57] ABSTRACT

A dehumidification system. The dehumidification system utilizes the deflection of high velocity air flow to facilitate the removal of condensate from the cooling coil in the system. The amount of condensate which is reclaimed by the air stream passing through the dehumidification system is minimized.

9 Claims, 2 Drawing Sheets

DEHUMIDIFICATION SYSTEM

This invention relates to dehumidification apparatus. More particularly, the invention relates to apparatus which can, in a structure which has been flooded and had standing water removed from the floor by vacuum extraction or other means, be used effectively to promptly dehumidify air in a room to cause moisture to bleed into the air from and to dry walls, flooring, and furniture before mildew or other fungi have had time to grow, discolor, and damage the furniture, walls, flooring, and other materials in the room.

In another respect, the invention relates to dehumidification apparatus which utilizes high velocity air flow to draw large volumes of air over a cooling coil to facilitate the rapid removal of condensate from the coil.

In a further respect, the invention pertains to dehumidification apparatus which minimizes the amount of condensate reclaimed by the air stream passing through the dehumidification apparatus.

Apparatus for dehumidifying air has long been utilized. See, for example, U.S. Pat. Nos. 3,304,696 to McKenna, 3,313,123 to Ware, 4,497,182 to Youngworth, 4,428,205 to Doderer and Volume D, page 98 of the 1989 World Book Encyclopedia. Conventional air conditioning and dehumidification units often operate at relatively low air velocities in the range of 100 to 500 feet per minute and utilize fans which force air through a dehumidifier at a rate of 50 to 150 cubic feet per minute. Such conventional air conditioning and dehumidification units have drawbacks. First, after a home or other building structure is flooded and has had standing water removed from the floor by vacuum extraction or other means, a small conventional air dehumidification unit can require three or more days to extract from floors and walls in the room an amount of moisture sufficient to prevent mildew or other fungi from forming and discoloring, rotting, imparting a disagreeable odor to, and otherwise damaging furniture, flooring, and other objects in the room. Expending three or more days in dehumidifying a room is often not effective under moderate ambient relative humidity in the range of 40% to 70% relative humidity because mildew can form within several days. Further, under unusually high ambient temperatures and humidities, the formation of mildew is accelerated. In order to prevent the formation of mildew a plurality of smaller sized conventional dehumidification units can be utilized, or a very large conventional dehumidification unit can be utilized. Making use of a plurality of small conventional dehumidification units or of a very large unit is not, however, cost effective nor is the use of desiccants. Desiccants dry air at a relatively slow rate and are most effective when there is a low relative humidity involved, say 30% or less. A second problem encountered with conventional dehumidification units is that while the condensate is draining from the cooling coils into the tray or while the condensate is stored in the tray, air flowing through the dehumidifier picks up and carries condensate out of the dehumidifier away from the cooling coils, particularly when air flows through the cooling coils at high velocities. This problem is memorialized in U.S. Pat. No. 3,304,696 to McKenna. A third problem associated with conventional dehumidification units is the loss of air velocity which occurs when incoming air traverses the cooling coil. Fans used to push air through a dehumidification unit or an air conditioning unit often move substantial volumes of air, but the fans only force minor amounts of air through the dehumidification units or air conditioner. For example, a 3,000 cubic feet per minute fan customarily forces only 50 cubic feet per minute through the coils of a dehumidification unit.

Accordingly, it would be highly desirable to provide an improved dehumidification apparatus which is economical in construction, is small in size, is portable, can effectively cycle large volumes of air in a room through the apparatus to rapidly remove water from the air and cause water to bleed from water-logged walls and flooring into the air to prevent the formation of mildew in the walls and flooring, and minimizes the amount of condensate picked up by a stream of air flowing through the dehumidification apparatus.

Therefore, it is a principal object of the invention to provide an improved air dehumidification apparatus.

Another object of the invention is to provide a dehumidification unit of relatively small size which can, after a room has been flooded and standing water has been removed from the room, rapidly dehumidify air in the room to drain moisture into the air to dry the walls and flooring and prevent the formation of mildew in the room.

A further object of the invention is to provide a dehumidification unit which minimizes the amount of condensate picked up by a stream of the air flowing through the unit.

Still another object of the invention is to provide a dehumidification unit which, in order to create a high velocity air flow through the cooling coil of the unit to increase the efficiency of the unit, utilizes a blower which has a relatively high static pressure and which is positioned to pull air through the dehumidification unit.

These and other further and more specific objects and advantages of the invention will be apparent to those skilled in the art from the following detailed description thereof, taken in conjunction with the drawings, in which.

Figure 1:
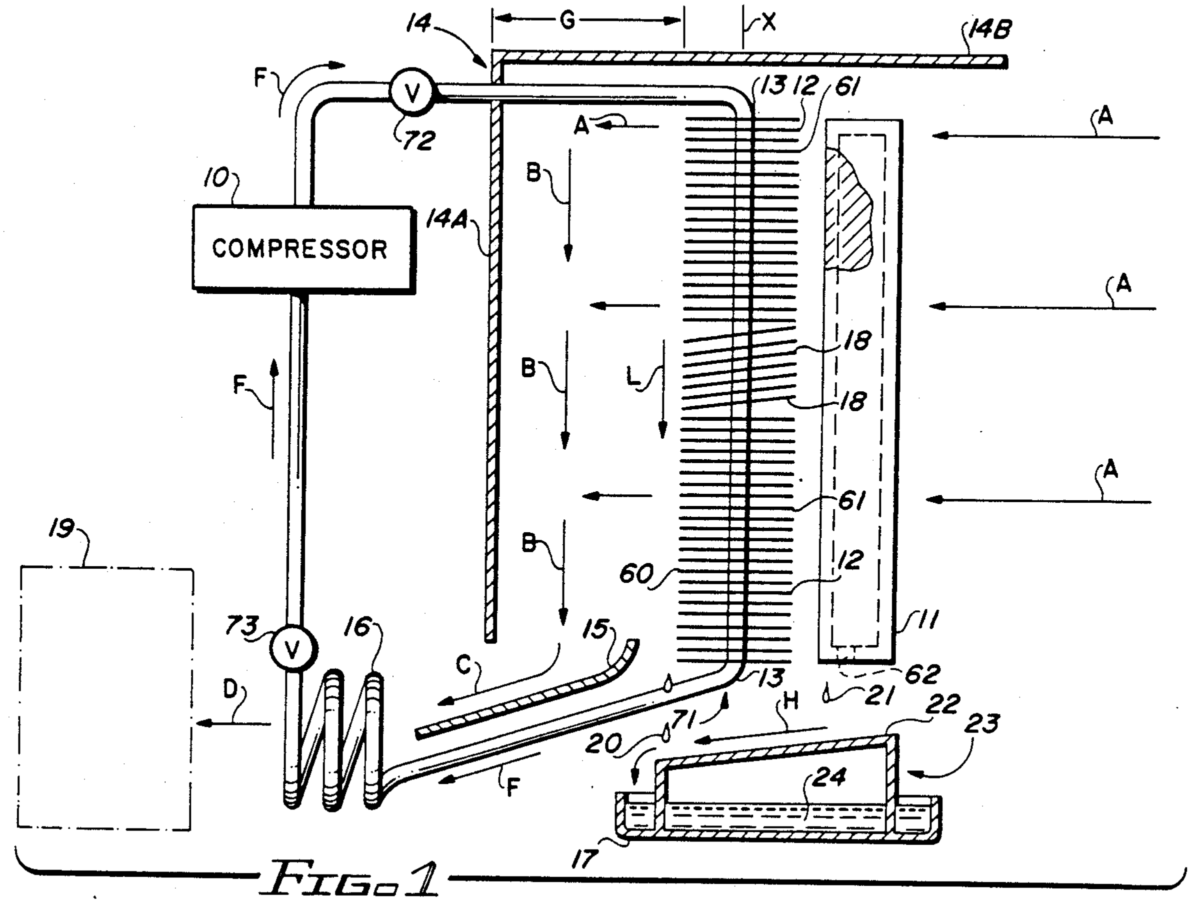
FIG. 1 is a schematic drawing illustrating dehumidification apparatus constructed in accordance with the principles of the invention.

Briefly in accordance with my invention, I provide an improved dehumidification apparatus. The apparatus includes coil means for cooling air passing over the coil means and for causing water to condense from the air onto the coil means, the coil means including a first entrance side, air flowing toward the entrance side to pass over the coil means to be cooled and condense water onto the coil means, and including a second exit side spaced away from the entrance side, cooled air flowing in a selected direction of travel away from the second side and the coil means; air deflection means shaped and dimensioned to deflect cooled air from the selected direction of travel such that the deflected air generates forces acting on at least a portion of the condensed water on the coil means to assist in moving the water over the coil means; and, means for imparting motive force to air such that the air flows toward the entrance side over the coil means, away from the exit side, and is deflected by the deflection means to assist in moving the condensed water over the coil means.

In another embodiment of my invention, I provide improved dehumidification apparatus. The apparatus includes coil means for cooling air passing over the coil means and for causing water to condense from the air onto the coil means, the coil means including a first entrance side, air flowing toward the entrance side to pass over the coil means to be cooled and condense water onto the coil means, and including a second exit side spaced away from the entrance side, cooled air flowing in a selected direction of travel away from the second side and the coil means; and, means for imparting motive force to air such that the air flows toward the entrance side, over the coil means, and away from the exit side. The motive force means include means for pulling air from the first side, over the coil means and away from the exit side toward the pulling means.

In still a further embodiment of my invention, I provide improved dehumidification apparatus including coil means for cooling air passing over the coil means and for causing water to condense from the air onto the coil means, the coil means including a first entrance side, air flowing toward the entrance side to pass over the coil means to be cooled and condense water onto the coil means, and including a second exit side spaced away from the entrance side, cooled air flowing in a selected direction of travel away from the second side and the coil means; means for imparting motive force to air such that the air flows toward the entrance side over the coil means and away from the exit side; tray means positioned beneath the coil means for collecting condensed water moving toward and into the tray means; and, a sloped surface positioned above collected water in the tray means, at least a portion of the condensed water from the coil means contacting and traveling down the sloped surface in a direction away from the entrance side and from at least a portion of the coil means, and traveling into the tray means.

Turning now to the drawings, which depict the presently preferred embodiments and best mode of the invention for the purpose of illustrating the practise thereof and not by way of limitation of the scope of the invention and in which like reference characters represent corresponding elements throughout the several views, FIG. 1 illustrates dehumidification apparatus including aluminum water-condensing screen 11, cooling fins 12 mounted on evaporator coil 13, condenser coil 16, compressor 10, and deflector members 14 and 15. Member 14 includes panel members 14A and 14B. The squirrel cage static resistance blower 19 imparts motive power to air such that the air flows in the direction of arrows A toward the entrance side of coil 13, over the coil 13, away from the exit side of coil 13, and is deflected downwardly in the direction of arrows B by deflector member 14. Deflector member 15 deflects air traveling downwardly in the direction of arrow B in the direction of arrow C and over condenser coil 16 and, as indicated by arrow D, into static resistance blower 19. Fins 12 are generally perpendicular to vertical axis X. If desired, fins 18 which are sloped with respect to axis X can be mounted on coil 13. Arrows G indicate the shortest distance from the exit side of fins 12 to vertically disposed panel member 14A of deflector member 14. Tray 17 collects condensate droplets 20 and 21 which fall from fins 12, 18 and from aluminum screen 11, respectively. Droplets 20 and 21 fall against upper sloped surface 22 of stand 23. Water travels down surface 22 in a direction of travel indicated by arrow H. Arrow H includes a vector component in a direction away from coil 13 and fins 12, 18. Water flowing down surface 22 travels into and is collected by tray 17. Sloped surface 22 covers water 24 collected in tray 17 and prevents water 24 from being picked up by the air stream traveling through the dehumidification apparatus of FIG. 1 in the direction of arrows A, B, C and D. Arrows F indicate the direction of flow of freon or other refrigerant through cooling coil 13, condenser coil 16 and compressor 10.

In the presently preferred embodiment of the invention, the distance indicated by arrows G is in the range of 0.5 inch to 2 inches, and preferably is from 1 inch to 1.25 inches. The cross sectional area of coil 13 and fins 12, 18 traversed by the stream of air flowing through coil 13 in the direction of arrow A is indicated by arrows J and K in FIG. 2. Arrows J indicate a distance of 10 inches. Arrows K indicate a distance of 8 inches. Air exits fins 12 at 600 to 800 cubic feet per minute, or in other words, air travels over coil 13 at a velocity in the range of about 1000 feet per minute to 1400 feet per minute. Static resistance blower 19 has a rating of 1600 cubic feet per minute. The air resistance created by screen 11, fins 12 and 18, and coil 13 reduces the 1600 cubic feet per minute to the 600 to 800 cubic feet per minute flow rate which exists as air exits fins 12 and 18 traveling toward deflector panel member 14A. Blower 19 generates 1.2 inches of water static pressure. In the operation of the dehumidification apparatus of the invention it is preferred that blower 19 generate static pressure in the range of 0.5 to 3.0 inches of water.

The downward deflection of air in the direction of arrow B is important in the utilization of the invention because air traveling in the direction of arrow B produces frictional forces L along the exit edges of fins 12 and 18. Forces L tend to "wipe" condensate downwardly along the exit edges of fins 12 and 18 toward sloped surface 22. Further, the downward forces imparted by air flowing in the direction of arrows B on condensate reduces the quantity of condensate picked up by the air stream flowing into, through, and away from coil 13 and fins 12 and 18. If the dimension indicated by arrows G becomes too large, or if the velocity of air through the dehumidification apparatus becomes too small, the downward forces L generated along the exit edges of fins 12 and 18 are minimal and, practically speaking are of no force and effect. Consequently, if the air velocity through the apparatus of FIG. 1 remains constant, and the distance G deflector panel member 14A away from the exit edges 12 and 18 is increased, the magnitude of force L decreases. Further, as the distance G increases, the magnitude of forces L tends, if the velocity of air through the coil 13 remains constant, to decrease rather rapidly. In the practise of the invention, it is preferred that the distance G and the velocity of air traveling in the direction of arrow A into coil 13 be sufficient to produce, within ¼ inch to 3 inches of the exit edges of fins 12 and 18, air traveling in the direction of arrows B at a velocity in the range of 500 to 5000 feet per minute.

Screen 11 is, as earlier noted, fabricated from aluminum. Aluminum has a high thermal conductivity which facilitates the cooling of air and condensation of water from the air onto screen 11. Condensate 21 on screen 11 flows downwardly over the screen and onto sloped surface 22.

Figure 3:
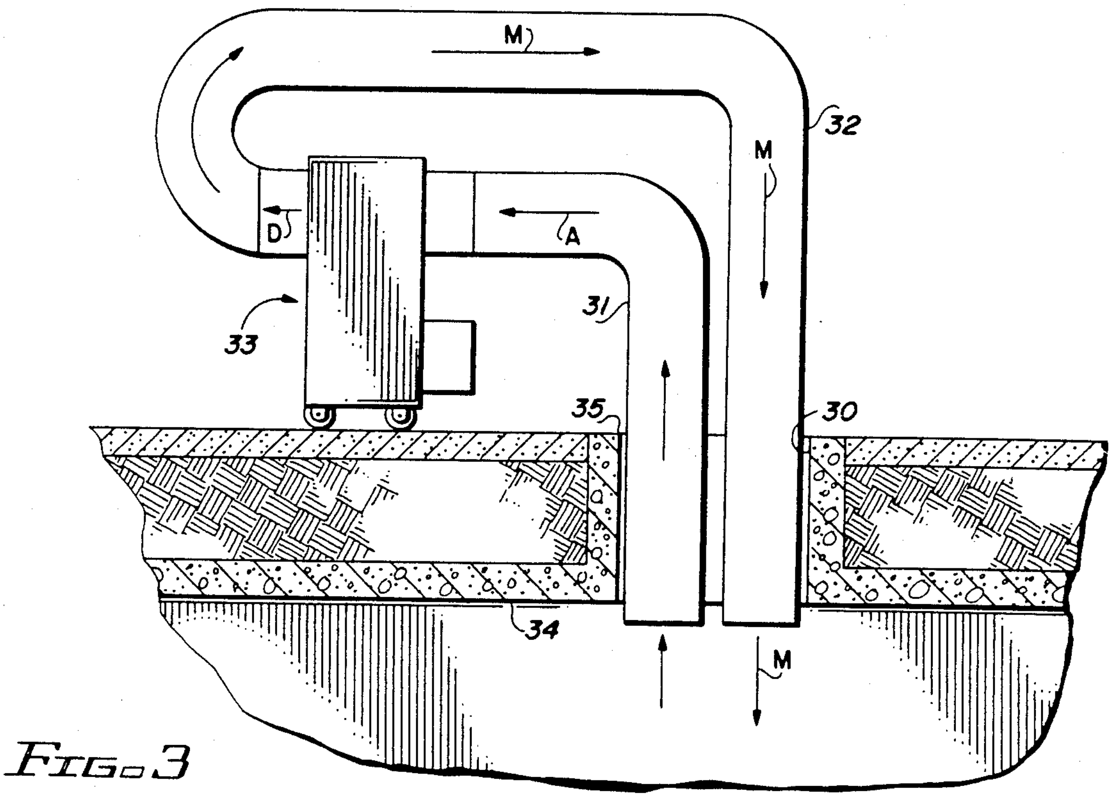
FIG. 3 is a side view illustrating the mode of operation of dehumidification apparatus constructed in accordance with the invention.

In FIG. 3, the dehumidification apparatus of FIG. 1 is mounted inside housing 33. The dehumidification apparatus in housing 33 draws air from line 34 upwardly through manhole 35 and into housing 33 in the direction of arrow A. Air exiting housing 33 in the direction of arrow D travels through conduit 32 and back into line 34. Consequently, the dehumidification apparatus in housing 33 continually draws warm air upwardly through conduit 31 and housing 33. Dehumidified air produced by the apparatus in housing 33 travels through conduit 32 back into line 34. Many conventional dehumidification units simply do not have the capability to effectively quickly dehumidification and cool large volumes of air contained in a line, industrial plant, or other area containing large volumes of humid air.

As noted, deflector member 14 downwardly deflects air in the direction of arrow B toward member 15. When air is traveling downwardly in the direction of arrow B, it is traveling in a direction of travel which is generally parallel to the incoming flow of air, indicated by arrows A, and which is generally parallel to the exit edges 60 of fins 16, 18. The exit edges 60 lie in a common plane which is perpendicular to the plane of the paper of the drawing of FIG. 1 and which is parallel to axis X and to the common plane in which the entrance edges 61 of fins 12 and 18 lie. The entrance edges 61 lie in a common plane which is perpendicular to the plane of the paper of the drawing of FIG. 1 and which is parallel to axis X and to the direction of travel indicated by arrows B.

Figure 2:
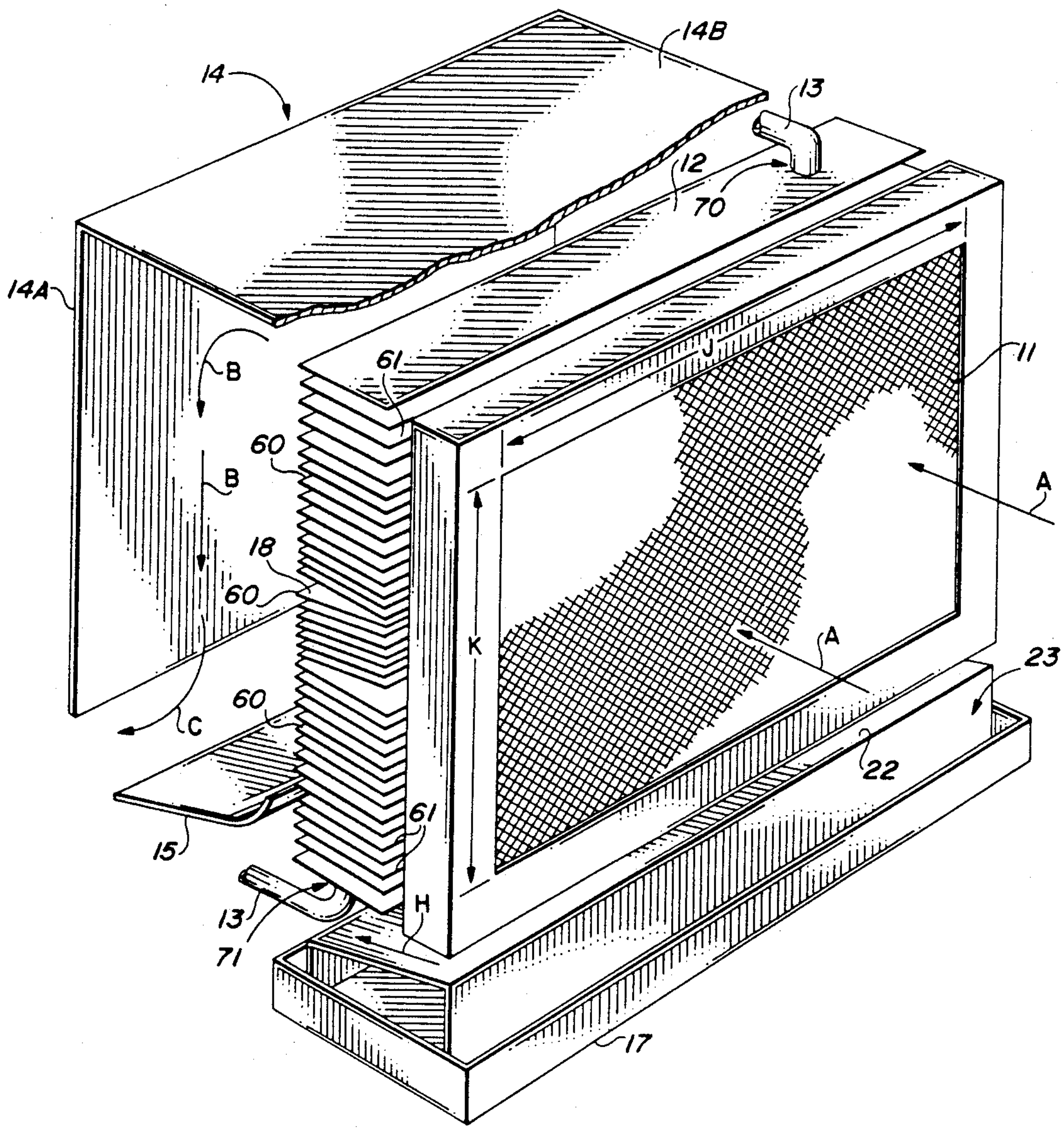
FIG. 2 is a perspective view of selected portions of the apparatus of FIG. 1 further illustrating construction detail thereof.

The compressor and evaporator are omitted from FIG. 2 for the sake of clarity.

Weep holes 62 can be formed along the bottom of the frame or housing of screen 11 to facilitate the flow of condensed water downwardly from the screen onto surface 22.

In FIGS. 1 and 2, fins 12 and edges 60 are horizontally oriented. To further facilitate the removal of water droplets from the fins, fins 12 and edges 60 can be vertically oriented. Also, in FIGS. 1 and 2, the water-condensing screen is illustrated as being on the incoming side of the fins 12. The screen 11 can be on the exit side of fins 12, i.e., screen 11 can be on the same side of the fins 12 as is deflector panel member 14A.

In FIGS. 1 and 2, the points at which cooled freon enters the coil 13 is indicated by arrow 70. The point at which the freon exits the coil is indicated by arrow 71. An important objective of the invention is to minimize the rise in temperature of the freon as it passes through the coil 13. In conventional units the temperature of the fluid will often rise about ten to eighteen degrees F. as it passes through coil 13. In the preferred embodiment of the invention, the temperature of the fluid generally remains constant as it passes through coil 13. Temperature of the fluid when it enters 70 coil 13 is typically about one to three degrees less than the temperature of the fluid exiting 71 coil 13.

Dupont R502 refrigerant is presently preferred in the operation of the dehumidification system of the invention. Dupont R502 has a low condensing temperature of 94° F. A refrigerant with a condensing temperature of 98° F. or less is preferred in the practice of the invention.

The temperature of the refrigerant passing through coil 13 is preferably maintained at a temperature which is about 30° F. lower than the ambient temperature. Maintaining the refrigerant at a temperature of about 30° F. less that the ambient air temperature ordinarily means that the temperature of the refrigerant flowing through coil 13 will be less than the dewpoint of the air. In order to maintain the refrigerant flowing through coil 13 at a temperature which is about 30° less than normal and is below the dewpoint, a valve 72 is used. The valve includes a freon bulb. As the temperature of the ambient air increases, freon in the bulb expands, causing the valve to open. The warmer the air temperature, the more the valve 72 is opened and the greater the volume of freon which flows through coil 13 per second of time. In one type of valve 72, as the freon in the bulb expands, it presses against a diaphragm to open the valve 72 further. Since freon expands at known increments with increases in temperature, and since the opening in the line leading to coil 13 which is necessary to permit the volume of freon to flow through coil 13 to maintain the coil at about 30° F. below the ambient temperature is known, valve 72 can be constructed such that the expanding and contracting freon automatically controls the flow of freon through coil 13 with changes in temperature and such that the temperature of freon entering coil 13 is about 30° F. lower than the ambient temperature. If desired, a valve 73 can be placed in the path of air flowing off of the condenser coil 16, and can be utilized in place of valve 72.

Having described my invention in such terms as to enable those skilled in the art to understand and practise it, and having identified the presently preferred embodiments thereof, I claim:

1. A dehumidifier, including the (a) coil means for cooling air passing over said coil means and causing water to condense from the air onto the coil means, said coil means including
  (i) a first entrance side, air flowing toward said entrance side to pass over said coil means and be cooled and condense water onto said coil means, and
  (ii) a second exit side spaced away from said entrance side, cooled air flowing in a selected direction of travel away from said second side and said coil means;
(b) air deflection means shaped and dimensioned to deflect cooled air from said selected direction of travel such that said deflected air generates forces acting on at least a portion of said condensed water on said coil means to assist in moving said water over said coil means; and,
(c) means for imparting motive force to air such that said air flows toward said entrance side, over said coil means, away from said exit side, and is deflected by said deflection means to assist in moving said water over said coil means.

2. The dehumidifier of claim 1 wherein said motive force imparting means includes pulling means for generating static pressure in the range of 0.5 to 3.0 inches of water to pull air from said first side, over said coil means, and away from said exit side toward said pulling means.

3. The dehumidifier of claim 2 including (a) tray means positioned beneath said coil means for collecting condensed water moving toward and into said tray means; and,
(b) a sloped surface positioned above collected water in said tray means, at least a portion of said condensed water from said coil means contacting and traveling
  (i) down said sloped surface in a direction away from said entrance side and from at least a portion of said coil means, and
  (ii) into water collected in said tray means.

4. The dehumidifier of claim 1 including (a) tray means positioned beneath said coil means for collecting condensed water moving toward and into said tray means; and, (b) a sloped surface positioned above collected water in said tray means, at least a portion of said condensed water from said coil means contacting and traveling (i) down said sloped surface in a direction away from said entrance side and from at least a portion of said coil means, and (ii) into water collected in said tray means.

5. The dehumidifier of claim 4 wherein said motive force imparting means includes pulling means for generating static pressure in the range of 0.5 to 3.0 inches of water to pull air from said first side, over said coil means, and away from said exit side toward said pulling means.

6. The dehumidifier of claim 1 wherein said coil means is cooled by a refrigerant flowing through said coil means at a selected adjustable flow rate.

7. The dehumidifier of claim 6 including valve means for adjusting said flow rate of said refrigerant through said coil means, said valve means being responsive to the temperature of said refrigerant to adjust said flow rate of said refrigerant through said coil means.

8. The dehumidifier of claim 7 including (a) means for delivering cooled refrigerant to said coil means to flow therethrough and absorb heat from air flowing over said coil means, and, (b) means for receiving refrigerant which has flowed through said coil means and absorbed heat from air flowing over said coil means.

9. The dehumidifier of claim 8 wherein the temperature of said cooled refrigerant is 1° F. to 3° F. less than the temperature of refrigerant received from said coil means by said receiving means.

* * * * *